(12) United States Patent
Gale et al.

(10) Patent No.: US 11,376,973 B2
(45) Date of Patent: Jul. 5, 2022

(54) METHOD AND SYSTEM FOR MONITORING TEMPERATURE OF A POWER DISTRIBUTION CIRCUIT

(71) Applicant: Ford Global Technologies, LLC, Dearborn, MI (US)

(72) Inventors: Allan Roy Gale, Livonia, MI (US); Michael W. Degner, Novi, MI (US); Larry Dean Elie, Ypsilanti, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 948 days.

(21) Appl. No.: 15/493,862

(22) Filed: Apr. 21, 2017

(65) Prior Publication Data

US 2017/0225576 A1 Aug. 10, 2017

Related U.S. Application Data

(63) Continuation-in-part of application No. 12/423,169, filed on Apr. 14, 2009, now Pat. No. 9,634,516.

(51) Int. Cl.
*B60L 53/14* (2019.01)
*B60L 53/20* (2019.01)
(Continued)

(52) U.S. Cl.
CPC .............. *B60L 53/14* (2019.02); *B60L 53/20* (2019.02); *B60L 53/22* (2019.02); *G01K 7/16* (2013.01);
(Continued)

(58) Field of Classification Search
CPC .... B60L 11/1816; B60L 11/1812; B60L 3/04; B60L 2240/36; B60L 2240/547; B60L 2240/549; B60L 2210/30; B60L 53/14; B60L 53/20; B60L 53/22; G01K 7/16; H02J 7/027; H02J 7/047; H02J 7/0047; H02J 7/007192; H02J 7/02; H02J 7/04; Y02T 10/7005; Y02T 10/7241; Y02T 10/7072; Y02T 90/14; Y02T 90/168; Y02T 90/127;
(Continued)

(56) References Cited

U.S. PATENT DOCUMENTS 4,474,825 A 10/1984 Schmidt
4,573,132 A 2/1986 Boothman et al.
(Continued)

OTHER PUBLICATIONS

James P. Noon et al., UC3855A/B High Performance Power Factor Preregulator, Unitrode Corporation, U-153, pp. 1-20, 1999.
(Continued)

*Primary Examiner* — Richard Isla
*Assistant Examiner* — Manuel Hernandez
(74) *Attorney, Agent, or Firm* — David B. Kelley; Brooks Kushman P.C.

(57) ABSTRACT

A system of a vehicle includes a processor configured to control output current of a remote power distribution circuit (PDC) connected to the vehicle according to a temperature change of a power line or return line of the PDC. The temperature change is derived from a PDC output voltage or output current change. The PDC output voltage and output current are measured at an input to a load connected to the PDC. And, the PDC output voltage is measured between a ground line of the PDC and one of the power and return lines.

15 Claims, 2 Drawing Sheets

(51) Int. Cl.
*G01K 7/16* (2006.01)
*B60L 53/22* (2019.01)
*H02J 7/02* (2016.01)
*H02J 7/00* (2006.01)
*H02J 7/04* (2006.01)

(52) U.S. Cl.
CPC ...... *H02J 7/0047* (2013.01); *H02J 7/007192* (2020.01); *H02J 7/02* (2013.01); *H02J 7/027* (2013.01); *H02J 7/04* (2013.01); *B60L 2210/30* (2013.01); *B60L 2240/36* (2013.01); *B60L 2240/547* (2013.01); *B60L 2240/549* (2013.01); *B60Y 2200/91* (2013.01); *B60Y 2200/92* (2013.01); *Y02T 10/7072* (2013.01); *Y02T 90/14* (2013.01)

(58) Field of Classification Search
CPC .. Y04S 30/12; B60Y 2200/91; B60Y 2200/92
USPC .......................................................... 320/150
See application file for complete search history.

(56) References Cited

U.S. PATENT DOCUMENTS

| | | | |
|---|---|---|---|
| 5,181,026 | A | 1/1993 | Granville |
| 5,451,881 | A | 9/1995 | Finger |
| 5,590,964 | A | 1/1997 | Obara et al. |
| 5,598,084 | A | 1/1997 | Keith |
| 5,670,860 | A | 9/1997 | Conrady et al. |
| 5,725,307 | A | 3/1998 | Obara et al. |
| 5,952,813 | A | 9/1999 | Ochiai |
| 5,995,350 | A | 11/1999 | Kopelman |
| 6,087,802 | A | 7/2000 | James |
| 6,348,777 | B1 | 2/2002 | Brown et al. |
| 6,396,241 | B1 | 5/2002 | Ramos et al. |
| 6,479,968 | B1 | 11/2002 | Pozsgay et al. |
| 6,963,186 | B2 | 11/2005 | Hobbs |
| 7,107,162 | B2 | 9/2006 | Zima et al. |
| 7,400,476 | B1 * | 7/2008 | Hull, Jr. ............... H02H 11/002 361/42 |
| 7,593,747 | B1 * | 9/2009 | Karam .................. G06F 1/3203 455/522 |
| 2005/0222808 | A1 | 10/2005 | Zima et al. |
| 2005/0259373 | A1 * | 11/2005 | Hoopes .................. H02H 3/207 361/90 |
| 2006/0044846 | A1 * | 3/2006 | Hjort ....................... H02J 9/062 363/34 |
| 2006/0132085 | A1 | 7/2006 | Loubeyre |
| 2007/0038396 | A1 | 2/2007 | Zima et al. |
| 2007/0223155 | A1 * | 9/2007 | Kuo ..................... H02H 11/001 361/42 |
| 2008/0122400 | A1 | 5/2008 | Kubota et al. |
| 2009/0174362 | A1 | 7/2009 | Richardson et al. |
| 2009/0218988 | A1 | 9/2009 | Richardson et al. |
| 2010/0194354 | A1 * | 8/2010 | Gotou ..................... B60L 53/30 320/163 |
| 2010/0228413 | A1 | 9/2010 | Fujitake |
| 2010/0277127 | A1 | 11/2010 | Flack |
| 2011/0204849 | A1 * | 8/2011 | Mukai .................. B60L 3/0069 320/111 |
| 2012/0119702 | A1 * | 5/2012 | Gaul ..................... B60L 3/0069 320/109 |
| 2016/0107530 | A1 * | 4/2016 | Roberts .................... G01K 1/14 320/109 |
| 2016/0138980 | A1 * | 5/2016 | Jefferies .................. B60L 53/16 374/141 |
| 2017/0001529 | A1 * | 1/2017 | Fuchs ..................... B60L 53/16 |
| 2018/0056802 | A1 * | 3/2018 | Martel .................... B60L 53/18 |
| 2019/0360873 | A1 * | 11/2019 | Zoon ....................... H02H 7/226 |
| 2021/0063249 | A1 * | 3/2021 | Janssen .................... H04B 3/48 |
| 2021/0063457 | A1 * | 3/2021 | Frommberger ........ G01R 31/08 |
| 2021/0339640 | A1 * | 11/2021 | Yan .......................... B60L 3/04 |

OTHER PUBLICATIONS

Yijing Chen, et al., Control of a Single-Phase PFC Preregulataor [sic] Using an 8-Bit Microcontroller, pp. 1454-1460, 1-4244-0714-1/07, 2007, IEEE.

James P. Noon, A 250kHz, 500W Power Factor Correction Circuit Employing Zero Voltage Transitions, Unitrode Corporation, pp. 1-1 to 1-16, Oct. 1994, Texas Instruments Incorporated.

* cited by examiner

METHOD AND SYSTEM FOR MONITORING TEMPERATURE OF A POWER DISTRIBUTION CIRCUIT

CROSS-REFERENCE TO RELATED APPLICATION

This application is a continuation-in-part of application Ser. No. 12/423,169, filed Apr. 14, 2009, the disclosure of which is hereby incorporated in its entirety by reference herein.

BACKGROUND

A power cable is an assembly of two or more electrical conductors, usually held together with a sheath. The assembly may be used for transmission of electrical power. Power cables may be installed, for example, as permanent wiring within buildings, buried in the ground, run overhead, or exposed. Flexible power cables may be used for portable devices, mobile tools and machinery.

Cables may include three major components: conductors, insulation, and protective jacketing. The makeup of individual cables may vary with application. The construction and material may be determined by the working voltage, current-carrying capacity, and environmental conditions.

Power cables may use stranded copper or aluminum conductors. Small power cables may use solid conductors. The cable may include un-insulated conductors for circuit neutral or ground (earth) connection.

The overall assembly may be round or flat. Non-conducting filler strands may be added to the assembly to maintain its shape. Special purpose power cables for overhead or vertical use may have additional elements such as steel or Kevlar structural supports.

Common types of general-purpose cables are regulated by national and/or international codes. These codes define the various wire alloys that may make up a cable, its insulation type, and characteristics, including its resistance to chemicals and sunlight.

Commonly-used power cables may contain an un-insulated bare wire for connection to earth ground. Three prong power outlets and plug-cords require a grounding wire. Extension cables often have an insulated grounding wire.

ROMEX is a cable made of solid copper wires with a nonmetallic plastic jacket containing a waxed paper wrapped inner group of at least a pair of 600 volt THWN plastic insulated service wires and a bare ground wire. A common ROMEX cable may thus have three wires: a neutral wire (colored white), a wire providing power to the load (colored black), and a bare grounding wire.

Another common ROMEX variant has a neutral, identified by white coloring, two phase wires (a first conductor (black) and a second conductor (usually red)), and an un-insulated copper grounding wire. This type may be generally used for multiple switching locations of a common or shared lighting arrangement, such as for switches located at either end of a hallway, or on both upper and lower floors for stairway lighting.

SUMMARY

A system of a vehicle includes a processor that controls output current of a remote power distribution circuit (PDC) connected to the vehicle according to a temperature change of a power line or return line of the PDC that is derived from a PDC output voltage or output current change. The PDC output voltage and output current are measured at an input to a load connected to the PDC. The PDC output voltage is measured between a ground line of the PDC and one of the power and return lines.

A system of a vehicle includes a processor that controls output current of a remote power distribution circuit (PDC) connected to the vehicle according to a temperature change of a power or return line of the PDC derived from a PDC output voltage change that is measured at an input to a load connected to the PDC and between a ground line of the PDC and one of the power and return lines.

A power system of a vehicle includes a processor that controls output current of a remote power distribution circuit (PDC) connected to the vehicle according to a temperature change of a power line or return line of the PDC that is derived from a change in a PDC output voltage, a PDC output current, an input voltage to a load connected to the PDC, or an input current to the load. The PDC output voltage and output current are measured at an input to the load. The PDC output voltage is measured between a ground line of the PDC and one of the power and return lines.

DETAILED DESCRIPTION

Various embodiments of the present disclosure are described herein. However, the disclosed embodiments are merely exemplary and other embodiments may take various and alternative forms that are not explicitly illustrated or described. The Figures are not necessarily to scale; some features may be exaggerated or minimized to show details of particular components. Therefore, specific structural and functional details disclosed herein are not to be interpreted as limiting, but merely as a representative basis for teaching one of ordinary skill in the art to variously employ the present invention. As those of ordinary skill in the art will understand, various features illustrated and described with reference to any one of the Figures may be combined with features illustrated in one or more other Figures to produce embodiments that are not explicitly illustrated or described. The combinations of features illustrated provide representative embodiments for typical applications. However, various combinations and modifications of the features consistent with the teachings of this disclosure may be desired for particular applications or implementations.

Figure 1:
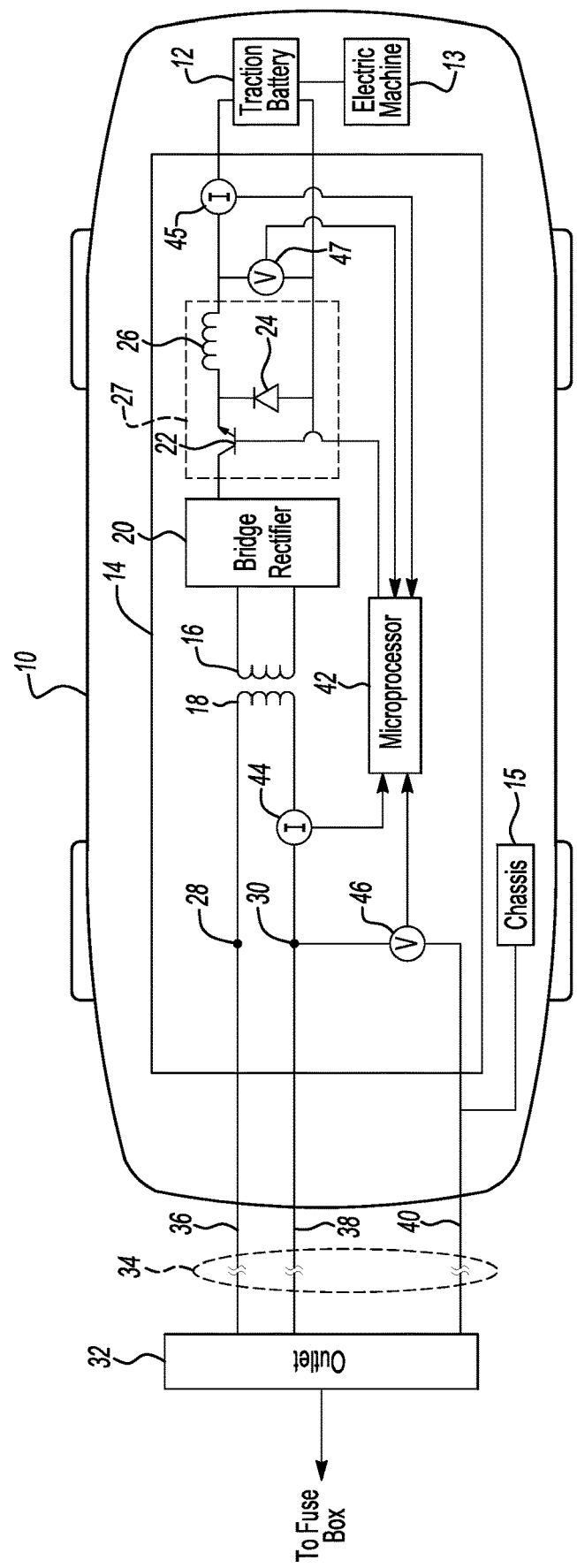
FIG. 1 is a schematic diagram of an automotive vehicle.

Referring now to FIG. 1, an embodiment of an automotive vehicle 10, e.g., hybrid electric, electric, etc., includes a traction battery 12, electric machine 13, battery charger 14, and chassis 15. As apparent to those of ordinary skill, the traction battery 12 may provide motive power for the vehicle 10 via the electric machine 13.

The battery charger 14 may include a pair of coils 16, 18, a bridge rectifier 20, transistor 22, diode 24, and inductor 26. As apparent to those of ordinary skill, the transistor 22, diode 24 and inductor 26 form a buck regulator 27 and may be used to regulate the current from the bridge rectifier 20 to the traction battery 12.

The coil 18 includes a power terminal 28 and a return terminal 30. The coil 18 may be electrically connected with an electrical outlet 32 via a power cable 34. The electrical outlet 32 of FIG. 1 is a 120 V wall outlet. In other embodiments, the electrical outlet 32 may be a 240 V wall outlet, a multiphase wall outlet, etc. As known in the art, the turn ratio of the coils 16, 18 may depend on the voltages associated with the battery 12 and outlet 32.

The coil 16 may be electrically connected with the traction battery 12 through the bridge rectifier 20, transistor 22, and inductor 26. As known in the art, the bridge rectifier 20 (or diode bridge) may be an arrangement of four diodes in a bridge configuration. This arrangement may provide the same polarity of output voltage for any polarity of input voltage. In this embodiment, the bridge rectifier 20 converts alternating current input into direct current output.

The power cable 34 includes a power line 36, return line 38, and ground line 40. The power line 36 is electrically connected with the power terminal 28. The return line 38 is electrically connected with the return terminal 30. The ground line 40 is electrically connected with the chassis 15. In the embodiment of FIG. 1, the power line 36 delivers current from the outlet 32 to the coil 18, and the return line 38 delivers current from the coil 18 to the outlet 32.

The battery charger 14 may also include a microprocessor 42, current sensors 44, 45, and voltage sensors 46, 47. The microprocessor receives current and voltage information from the current sensors 44, 45 and voltage sensors 46, 47. In the embodiment of FIG. 1, the current sensor 44 senses current through the coil 18 and return terminal 30, and the voltage sensor 46 senses voltage between the return terminal 30 and ground line 40. The current sensor 45 senses current to the traction battery 12 and the voltage sensor 47 senses voltage across the traction battery 12. Other arrangements, however, are also possible. As an example, the voltage sensor 46 may be positioned to sense voltage between the power terminal 28 and return terminal 30. As another example, the current sensor 44 and/or voltage sensor 46 may be positioned to sense current and/or voltage between the bridge rectifier 20 and transistor 22. Other configurations are also contemplated.

The microprocessor 42 may determine a change in temperature of the power and/or return lines 36, 38 based on, for example, the current and voltage measured by the current and voltage sensors 44, 46. The instantaneous resistance, R, of a wire having a temperature coefficient of resistance, a, may be related to a change in temperature, $\Delta T$, of the power and/or return lines 36, 38 by the following relation:

$$R = R_i(1 + \alpha \Delta T), \text{ or} \qquad (1)$$

$$\Delta T = \frac{\Delta R}{\alpha R_i} \qquad (2)$$

where $R_i$, is the initial resistance of the wire. In terms of voltages and currents, equation (2) may be rewritten as $$\Delta T = \left(\frac{V}{I} - \frac{V_i}{I_i}\right)\left(\frac{I_i}{V_i}\right)\left(\frac{1}{\alpha}\right), \text{ or} \qquad (3)$$

$$\Delta T = \left(\frac{V I_i}{V_i I} - 1\right)\left(\frac{1}{\alpha}\right) \qquad (4)$$

where I and V are the instantaneous current and voltage measured respectively by the sensors 44, 46, and $I_i$ and $V_i$ are the initial current and voltage measured respectively by the sensors 44, 46. Based on equation (4), the microprocessor 42 may determine a change in temperature of the power and/or return lines 36, 38 based on the current and voltage measured by the current and voltage sensors 44, 46. In other embodiments, the battery charger 14 may control the current flow through it to keep it generally constant, in a known fashion, and thus the microprocessor 42 may determine a change in temperature of the power and/or return lines 36, 38 based only on the voltage measured by the voltage sensor 46. In still other embodiments, the microprocessor 42 may determine a change in temperature of the power and/or return lines 36, 38 based on the voltage measured between the power terminal 28 and return terminal 30. As apparent to those of ordinary skill (using the notation described above), $$R_i = \frac{V_{LN}^- - V_{LN_i}^+}{2I} \qquad (5)$$

$$R = \frac{V_{LN}^- - V_{LN}^+}{2I} \qquad (6)$$

where $V_{LN}^-$ is the instantaneous voltage between the power terminal 28 and return terminal 30 just before current begins passing through the battery charger 14, $V_{LN_i}^+$ is the instantaneous voltage between the power terminal 28 and return terminal 30 just after current begins passing through the battery charger 14, and $V_{LN}^+$ is the instantaneous voltage between the power terminal 28 and return terminal 30 at any time after current begins passing through the battery charger 14. Substituting equations (5) and (6) into equation (2) (and simplifying) yields $$\Delta T = \left(\frac{V_{LN}^- - V_{LN}^+}{V_{LN}^- - V_{LN_i}^+} - 1\right)\left(\frac{1}{\alpha}\right) \qquad (7)$$

Based on equation (7), the microprocessor 42 may thus determine a change in temperature of the power and/or return lines 36, 38 based on the voltage measured between the power terminal 28 and return terminal 30.

Alternatively, a temperature or change in temperature of the power and/or return lines 36, 38 may be determined in any suitable fashion. For example, temperature sensors (not shown), e.g., Wheatstone bridge, diode junction, etc., in communication with the microprocessor 42 and connected with the power and/or return lines 36, 38 may detect and communicate the temperature of the power and/or return lines 36, 38 to the microprocessor 42.

The microprocessor 42 may turn on and turn off the transistor 22 to control the flow of current to the traction battery 12. The microprocessor 42 may thus control the flow of current through the power and/or return lines 28, 30 via the transistor 22.

The power, $P_{in}$, into the coil 18 is equal to the power, $P_{out}$, out of the coil 16 (assuming negligible losses):

$$P_{in} = P_{out} \qquad (8)$$

In terms of currents and voltages, equation (8) may be rewritten as $$(I_{rms} \cdot V_{rms}) \cos \theta = I_{BAT} \cdot V_{BAT} \qquad (9)$$

where $I_{rms}$ and $V_{rms}$ are the root mean square current into and root mean square voltage across the coil 18 respectively, $I_{BAT}$ and $V_{BAT}$ are the current into and voltage across the traction battery 12 (the current and voltage measured by sensors 45, 47 respectively), and $\cos \theta$ is the phase angle between $I_{rms}$ and $V_{rms}$. (As apparent to those of ordinary skill, $\cos \theta$ is typically equal to 1 in systems with unity power factor correction.) Assuming $V_{rms}$ and $V_{BAT}$ are generally constant and according to equation (9), changes in $I_{BAT}$ will result in changes to $I_{rms}$. That is, decreasing the duty cycle of the transistor 22 to reduce $I_{BAT}$ will reduce $I_{rms}$. (The microprocessor 42 may thus also determine a change in temperature of the power and/or return lines 36, 38 based on the current and voltage measured by the current sensor 44, 45 and voltage sensor 47. For example, equation (9) may be rearranged to solve for $V_{rms}$ and substituted into (7)).

To maintain the temperature of the power and/or return lines 28, 30 within a desired range, the microprocessor 42 may begin to cycle the transistor 22, in a known manner, as the temperature and/or change in temperature of the power and/or return lines 28, 30 begins to approach an upper end of the range. For example, the microprocessor 42 may begin to cycle the transistor 42 to reduce the current flow if the change in temperature of the power and/or return lines 28, 30 exceeds 35 degrees C. Alternatively, the microprocessor 42 may begin to cycle the transistor 42 to reduce the current flow if the temperature of the power and/or return lines 28, 30 is within 7 degrees C. of the upper end of the range. Any suitable control scheme, however, may be used.

As illustrated, the charger 14 is integrated with the vehicle 10. In other embodiments, however, the charger 14 may be remote from the vehicle 10. For example, the charger 14 may be a stand alone unit that may be plugged into the electrical outlet 32 and vehicle 10. Other arrangements are also possible.

Figure 2:
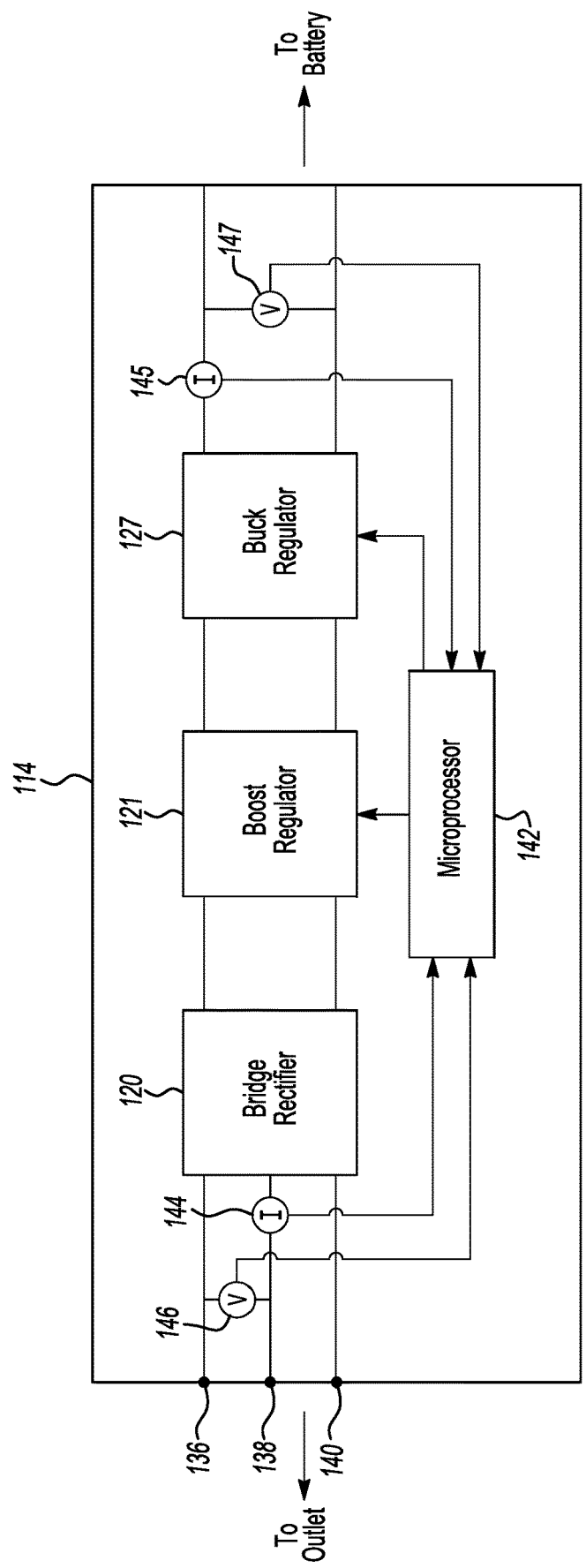
FIG. 2 is a schematic diagram of a battery charger.

Referring now to FIG. 2, numbered elements that differ by 100 relative to numbered elements of FIG. 1 have descriptions that are similar, although not necessarily identical, to the numbered elements of FIG. 1.

An embodiment of a battery charger 114 includes a bridge rectifier 120, boost regulator 121, buck regulator 127, and microprocessor 142. The bridge rectifier 120 is electrically connected with the boost regulator 121. The boost regulator 121 is electrically connected with the buck regulator 127. The microprocessor 142 may control the boost and buck regulators 121, 127. The circuitry of the bridge rectifier 120, boost regulator 121, and buck regulator 127 may take any suitable form.

The bridge rectifier 120 may be electrically connected with an electrical power outlet (not shown) and convert alternating current input into direct current output. As apparent to those of ordinary skill, the microprocessor 142 may control the boost regulator 121, in a known fashion, to regulate the direct current output by the bridge rectifier 120 for power factor correction. Based on current and/or voltage measurements by the sensors 144, 146, the microprocessor 142 may control the buck regulator 127, using techniques similar to those described above, for power distribution temperature management. Of course, other arrangements and/or configurations are also possible.

Because the supply line resistance associated with power and/or return lines, 136, 138 and rise in temperature can be measured over continuous intervals of time, elevated temperatures as well as varying resistances that may be due to heating, loose connections, arching and other conditions can be measured and used to reduce or increase power draw from the circuit.

The information regarding the characteristics of the circuit (including any of the variables or parameters mentioned above) and subsequent charge rate may be communicated via messages or otherwise to the vehicle user or third party (e.g., home owner, third party building repair service, utility company, safety office, other data acquisition and distribution center, etc.) via a wired connection (e.g., a CAN bus for the vehicle) or a wireless connection (e.g., cellular or WiFi transmissions, etc.) operatively associated with the microprocessor 142. Its use may be for purposes of updating the expected charge time as well as notifying personnel of potential problems with the local electric distribution system characteristics including voltage, wiring limitations, overload conditions, loose connections, arcing, as well as the identification of the specific line(s) incurring a problem. In FIG. 2, this would include power and return lines 136, 138.

While exemplary embodiments are described above, it is not intended that these embodiments describe all possible forms encompassed by the claims. The words used in the specification are words of description rather than limitation, and it is understood that various changes may be made without departing from the spirit and scope of the disclosure and claims. As previously described, the features of various embodiments may be combined to form further embodiments that may not be explicitly described or illustrated. While various embodiments may have been described as providing advantages or being preferred over other embodiments or prior art implementations with respect to one or more desired characteristics, those of ordinary skill in the art recognize that one or more features or characteristics may be compromised to achieve desired overall system attributes, which depend on the specific application and implementation. These attributes include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and may be desirable for particular applications.

What is claimed is:

1. A system of a vehicle comprising:
a processor configured to control output current of a remote grid power distribution circuit (PDC) connected to the vehicle, via a power cable that includes a power line, return line, and ground line each physically connected with and spanning between a wall outlet associated with the grid PDC and the vehicle, according to a temperature change of the power line or return line that is derived from a grid PDC output voltage or output current change, the grid PDC output voltage and output current being measured at an input to a load connected to the grid PDC, and the grid PDC output voltage being measured between the ground line and one of the power and return lines.

2. The system of claim 1, wherein the processor is further configured to transmit messages including data related to the grid PDC output voltage, the grid PDC output voltage change, the grid PDC output current, or the grid PDC output current change.

3. The system of claim 1, wherein the processor is further configured to transmit off-board the vehicle messages including data related to the grid PDC output voltage, the grid PDC output voltage change, the grid PDC output current, or the grid PDC output current change.

4. The system of claim 1, wherein the processor is included within a battery charger.

5. The system of claim 1, wherein the return line is a neutral line.

6. A system of a vehicle comprising:
a processor configured to control output current of a remote grid power distribution circuit (PDC) connected to the vehicle, via a power cable that includes a power line, return line, and ground line each physically connected with and spanning between a wall outlet associated with the grid PDC and the vehicle, according to a temperature change of the power line or return line that is derived from a grid PDC output voltage change measured at an input to a load connected to the grid PDC and between the ground line and one of the power and return lines.

7. The system of claim 6, wherein the processor is further configured to transmit messages including data related to the grid PDC output voltage change.

8. The system of claim 6, wherein the processor is further configured to transmit off-board the vehicle messages including data related to the grid PDC output voltage change.

9. The system of claim 6, wherein the processor is included within a battery charger.

10. The system of claim 6, wherein the return line is a neutral line.

11. A power system of a vehicle comprising:
a processor configured to control output current of a remote grid power distribution circuit (PDC) connected to the vehicle, via a power cable that includes a power line, return line, and ground line each physically connected with and spanning between a wall outlet associated with the grid PDC and the vehicle, according to a temperature change of the power line or return line that is derived from a change in a grid PDC output voltage, a grid PDC output current, an input voltage to a load connected to the grid PDC, or an input current to the load, the grid PDC output voltage and output current being measured at an input to the load, and the grid PDC output voltage being measured between the ground line and one of the power and return lines.

12. The system of claim 11, wherein the processor is further configured to transmit messages including data related to the grid PDC output voltage, the grid PDC output current, the input voltage to the load connected to the grid PDC, or the input current to the load.

13. The system of claim 11, wherein the processor is further configured to transmit off-board the vehicle messages including data related to the grid PDC output voltage, the grid PDC output current, the input voltage to the load connected to the grid PDC, or the input current to the load.

14. The system of claim 11, wherein the processor is included within a battery charger.

15. The system of claim 11, wherein the return line is a neutral line.

* * * * *